US011755845B2

(12) United States Patent
Ziskovsky

(10) Patent No.: US 11,755,845 B2
(45) Date of Patent: Sep. 12, 2023

(54) AUTOMATED PROCESS FOR GENERATING NATURAL LANGUAGE DESCRIPTIONS OF RASTER-BASED WEATHER VISUALIZATIONS FOR OUTPUT IN WRITTEN AND AUDIBLE FORM

(71) Applicant: International Business Machines Corporation, Armonk, NY (US)

(72) Inventor: Joseph Michael Ziskovsky, Cottage Grove, MN (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/351,513

(22) Filed: Jun. 18, 2021

(65) Prior Publication Data

US 2022/0405486 A1 Dec. 22, 2022

(51) Int. Cl.
| | |
|---|---|
| *G06F 40/40* | (2020.01) |
| *G06T 11/00* | (2006.01) |
| *G01W 1/10* | (2006.01) |
| *G10L 13/02* | (2013.01) |
| *G06F 40/166* | (2020.01) |
| *G01W 1/00* | (2006.01) |
| *G06N 20/00* | (2019.01) |

(52) U.S. Cl.
CPC .............. *G06F 40/40* (2020.01); *G01W 1/10* (2013.01); *G06F 40/166* (2020.01); *G06T 11/00* (2013.01); *G10L 13/02* (2013.01); *G01W 1/00* (2013.01); *G01W 2203/00* (2013.01); *G06N 20/00* (2019.01)

(58) Field of Classification Search
CPC ........ G06F 40/40; G06F 40/166; G01W 1/10; G01W 2203/00; G01W 1/00; G06T 40/166; G06T 11/00; G10L 13/02; G06N 20/00
See application file for complete search history.

(56) References Cited

U.S. PATENT DOCUMENTS

| | | |
|---|---|---|
| 6,266,063 B1 | 7/2001 | Baron |
| 7,181,345 B2 | 2/2007 | Rosenfeld |
| 8,818,029 B1 | 8/2014 | Mecikalski |
| 9,753,947 B2 | 9/2017 | Goering et al. |
| 10,319,062 B2 | 6/2019 | Greenwood |
| 10,437,814 B2 | 10/2019 | Hubbard |
| 10,613,252 B1 | 4/2020 | Mecikalski |
| 2004/0043760 A1 | 3/2004 | Rosenfeld |
| 2006/0245630 A1 | 11/2006 | Zahniser |

(Continued)

OTHER PUBLICATIONS

Kalchbrenner et al. (A Neural Weather Model for Eight-Hour Precipitation Forecasting, Google AI Blog, Mar. 25, 2020) (Year: 2020).*

(Continued)

*Primary Examiner* — Daniel R Miller
*Assistant Examiner* — Christian T Bryant
(74) *Attorney, Agent, or Firm* — Stephen R. Yoder

(57) ABSTRACT

Generating specific and contextualized natural language descriptions based upon raster-based weather visualizations for a defined geographic region. The generated natural language descriptions are provided in a written and/or audible form. In some cases, these natural language descriptions are generated based on weather forecast data sets that indicate a relative motion of certain weather-related events.

15 Claims, 8 Drawing Sheets

(56) References Cited

U.S. PATENT DOCUMENTS

| | | | |
|---|---|---|---|
| 2010/0111391 | A1 | 5/2010 | Valadez |
| 2016/0321513 | A1 | 11/2016 | Mitti |
| 2017/0011053 | A1 | 1/2017 | Hubbard |
| 2018/0329987 | A1 | 11/2018 | Tata |
| 2019/0250307 | A1 | 8/2019 | Baughman |
| 2020/0134103 | A1 | 4/2020 | Mankovskii |
| 2020/0166670 | A1* | 5/2020 | Zass .................. G06V 10/82 |

OTHER PUBLICATIONS

Eriksson et al. ("Natural language generated weather forecast from time series of weather data.", KTH Computer Science and Communication, 2014) (Year: 2014).*

Do ("Weather Forecast Voice System.", Faculty of Information Technology, Ho Chi Minh City University of Foreign Languages and Information Technology (HUFLIT) Rocling/IJCLCLP 2018) (Year: 2018).*

Belz, Anja, "Automatic Generation of Weather Forecast Texts Using Comprehensive Probabilistic Generation-Space Models", Natural Language Engineering 1 (1): 1-26, Printed in the United Kingdom, (Received Aug. 10, 2006; revised May 31, 2007), 26 pages, <https://core.ac.uk/download/pdf/188246925.pdf>.

Hickey, Jason, "Using Machine Learning to "Nowcast" Precipitation in High Resolution", Google AI Blog, Jan. 13, 2020, 3 pages, <https://ai.googleblog.com/2020/01/using-machine-learning-to-nowcast.html?m=1>.

Kittredge et al., "Meteocogent: A Knowledge-Based Toolfor Generating Weather Forecast Texts", CoGen Tex, Inc., Ithaca, NY, printed on Jan. 7, 2021, <http://cogentex.com/papers/meteocogent-98.pdf>.

Sripada et al., "Sumtime-Mousam: Configurable Marine Weather Forecast Generator", University of Aberdeen, UK, printed on Jan. 7, 2021, 6 pages, <http://citeseerx.ist.psu.edu/viewdoc/download?doi=10.1.1.11.2583&rep=rep1&type=pdf>.

Wikipedia, "Raster graphics", <https://en.wikipedia.org/wiki/Raster_graphics>, edited Mar. 27, 2021, 6 pages.

Zhao et al., "A CNN-RNN Architecture for Multi-Label Weather Recognition", arXiv:1904.10709v1 [cs.CV] Apr. 24, 2019, 29 pages.

* cited by examiner

600A

600B

AUTOMATED PROCESS FOR GENERATING NATURAL LANGUAGE DESCRIPTIONS OF RASTER-BASED WEATHER VISUALIZATIONS FOR OUTPUT IN WRITTEN AND AUDIBLE FORM

BACKGROUND

This invention generally relates to the field of processing weather-related data, and more specifically to producing raster-based weather visualizations.

In this document, the term "natural language description" is defined as the output of a "natural language processing" operation. The Wikipedia entry for "Natural language processing" (as of May 13, 2021) states as follows: "Natural language processing (NLP) is a subfield of linguistics, computer science, and artificial intelligence concerned with the interactions between computers and human language, in particular how to program computers to process and analyze large amounts of natural language data. The result is a computer capable of "understanding" the contents of documents, including the contextual nuances of the language within them. The technology can then accurately extract information and insights contained in the documents as well as categorize and organize the documents themselves."

The Wikipedia entry for "Raster graphics" (as of May 13, 2021) states as follows: "In computer graphics and digital photography, a raster graphic is a dot matrix data structure that represents a generally rectangular grid of pixels . . . viewable via a computer display, paper, or other display medium. Raster images are stored in image files with varying dissemination, production, generation, and acquisition formats."

SUMMARY

According to an aspect of the present invention, there is a method, computer program product and/or system that performs the following operations (not necessarily in the following order): (i) receiving a first weather data set, with the first weather data set including information indicative of: (a) a plurality of observed weather data points representing recent weather conditions, with the plurality of observed weather data points being a time ordered set of inputs, and (b) a defined geographic region; (ii) grouping a first portion of the plurality of observed weather data points based, at least in part, upon the first portion of the plurality of observed weather data points exceeding a first threshold; (iii) applying, by a machine learning module, machine learning techniques to the first portion of the plurality of observed weather data points in the defined geographic region to create a weather model, with the weather model having information indicative of a relative motion of the recent weather conditions; (iv) analyzing, by the machine learning module, the relative motion of the recent weather conditions; and (v) responsive to the analysis of the relative motion of the recent weather conditions, creating, by a text description module, a natural language summarization of the recent weather conditions in the defined geographic region.

DETAILED DESCRIPTION

Figure 1:
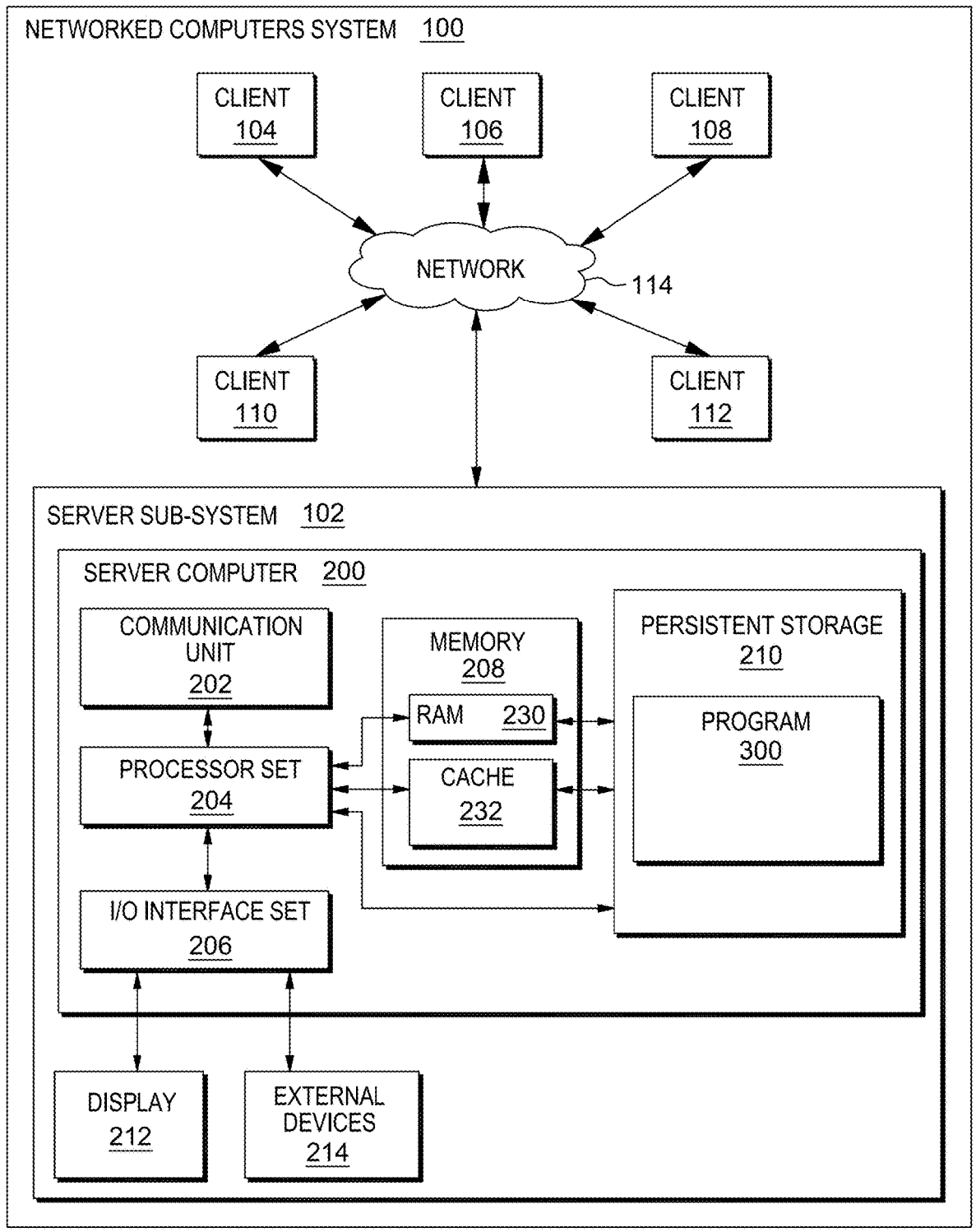
FIG. 1 is a block diagram view of a first embodiment of a system according to the present invention.

Some embodiments of the present invention are directed towards generating specific and contextualized natural language descriptions based upon raster-based weather visualizations for a defined geographic region. The generated natural language descriptions are provided in a written and/or audible format. In some cases, these natural language descriptions are generated based on weather forecast data sets that indicate a relative motion of certain weather-related events.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
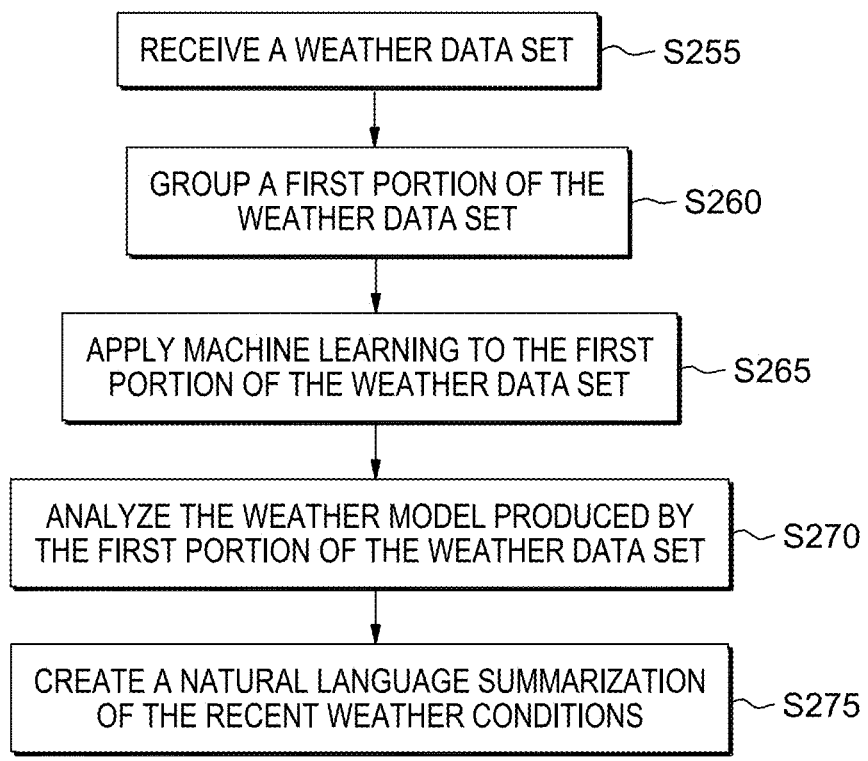
FIG. 2 is a flowchart showing a first embodiment method performed, at least in part, by the first embodiment system.
Figure 3:
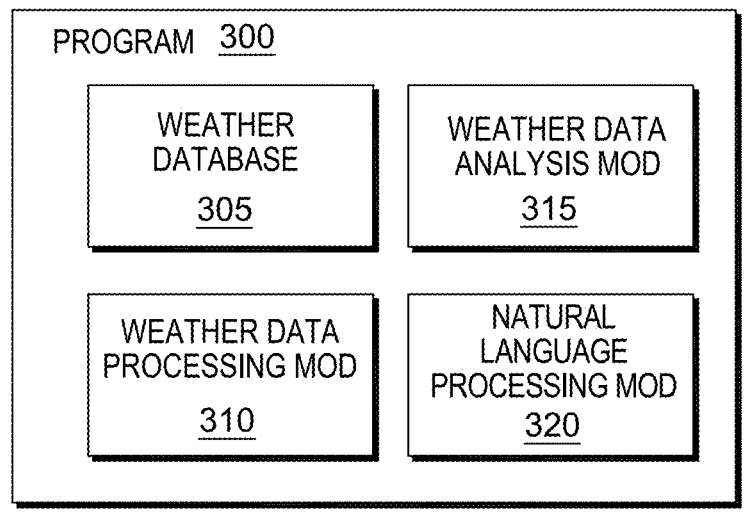
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where weather processing module ("mod") 310 receives a weather data set from weather database 305. Weather database 305 includes various weather-related information such as (but not necessarily limited to the following): weather data points that are observed by a given user or a set of weather-measuring instruments and a geographic region that is used to determine granular weather conditions. In some embodiments, the weather data points represent historical, current and/or predicted future weather conditions.

Processing proceeds to operation S260, where weather data processing mod 310 creates a grouping (or multiple sets of groupings) of certain portions of the weather data set (discussed above in connection with operation S255, above). The manner in which these groupings are formed is discussed in greater detail in Sub-Section III, below.

Processing proceeds to operation S265, where weather data processing mod 310 applies machine learning (ML) techniques to at least one grouping of the weather data set (discussed in connection with operation S260, above). By applying machine learning techniques to the grouping (portion) of the weather data set, weather data processing mod 310 ultimately produces a weather model. This weather model includes information relating to historical/current/future precipitation levels in a defined geographic area. An example of this weather model can be seen in screenshots 600A through 600G in FIGS. 6A through 6G, which are discussed in greater detail below.

Processing proceeds to operation S270, where weather data analysis mod 315 analyzes the weather model to glean meaningful insights, such as the relative motion of recent weather conditions (that are received from the weather data points discussed in connection with operation S255, above).

Processing finally proceeds to operation S275 where natural language processing mod 320 generates a natural language summarization of the insights gleaned from the analyzed weather model (discussed in connection with operation S270, above). In some embodiments, mod 320 creates a natural language summary of the speed and direction of certain identified weather phenomenon. An example of this summary is shown below in connection with the discussion of FIGS. 6A through 6G, below.

III. Further Comments and/or Embodiments

Some embodiments of the present invention recognize the following facts, potential problems and/or potential areas for improvement with respect to the current state of the art: (i) visually impaired citizens are unable to take advantage of weather RADAR related displays in modern media forms; (ii) having a natural language description of a every updating RADAR display provides these citizens with an understanding of the otherwise visual RADAR image display; (iii) such a natural language description typically relates to the intensity of the precipitation, movement direction and speed over a set time interval; (iv) modern forms of such messaging focus heavily on the "forecasted position" of the precipitation (as evidenced by modern severe weather crawl solutions) but no current implementations provide a synopsis automatically and audibly that properly described the nature of a RADAR image and/or loop of images; and (v) this is not necessarily limited to RADAR data.

Some embodiments of the present invention may include one, or more, of the following features, characteristics and/or advantages: (i) relies on the generation of a description of the current precipitation characters with regards to intensity, speed and movement and coverage for a given geographic region; (ii) additional data sets include real-time lightning data; (iii) the input data sets are received and normalized against the geographic region (defined display space) visually defined for a display; (iv) this can be provided for a non-actively displayed (planned) or active display; (v) a series of historically observed data sets, including the most recent observed weather data set, are analyzed based on individual data values to determines overall motion, even if only the latest set of data is displayed.

Some embodiments of the present invention may include one, or more, of the following features, characteristics and/or advantages: (i) consumer definable thresholds for input values based on the primary input value as well as referenced associated storm relative motion data are identified; (ii) groupings of values that meet or exceed certain thresholds are used to identify scale and congruency (existence or lack of) of value; (iii) the description of the overall values structure are generated and referenced against the geographical location(s) within the defined display space to generate a narrative of the data set in preparation for its display; and (iv) this generated description is then processed by Automated Speech Generation to generate output audio (in either a live or in audio format).

In some embodiments of the present invention, as ATSC 3.0 (and the equivalents in regions around the globe) continues to improve, and the issue of providing services and content to all consumers is addressed, converting rasterized weather data (such as RADAR) to narrative descriptive text for certain consumers, and further to speech for further delivery to potentially visually impaired consumers, strengthens the proprietary weather toolkit across all screens. Alternatively, this service could be provided to any consumer on the globe using past data related to precipitation.

Because certain embodiments of the present invention are display screen independent, it could be used in a live or rendered environment in broadcast media or in OTT and Web-based situations.

Operations for implementing a method according to some embodiments of the present invention are provided. Inputs for this method include the following: (i) geographical range; (ii) a database of known geographical locations; (iii) client defined library of value thresholds and descriptions associated with said threshold(s); and (iv) the current and immediate past (n) number of raster data files that are fed to an Augmented Intelligence analysis engine for processing.

In some embodiments of this method, individual raster-based datapoints are analyzed by Augmented Intelligence module(s) against client defined data thresholds for congruency and placement within: (i) the geographic region, (ii) growth or decay with regards to congruent value sets and/or (iii) storm relative motion of the values sets.

Next, the cumulative analysis is combined into a short descriptive statement using the client defined thresholds and position of the data relative to keep geographic locations in the locations database, describing the overall raster data display of the primary data layer with reference to the display.

Finally, the statement is fed to an Augmented Intelligence Natural Language engine to create an audible output automatically matching the written description that can be used across media display devices to reach all levels of consumer.

In some embodiments of the present invention, there is a method works in the following way: For a given geographic range defined by the user or raster data, relevant raster datasets are analyzed by an augmented intelligence raster data analysis. The overall analysis of the geographical range is referenced against a locations database and a user defined data value description threshold library. The feedback of this enables the value processing module to generate a natural language text description of the data for the user that describes the visual display of the data as it relates to the overall geographic range. This output is processed through text-to-speech technologies. Additionally, an audible description to match the visual geographical display of the data for the user is provided as an additional output.

Some embodiments of the present invention provide a method for automatically generating natural language descriptions of raster-based weather graphical representations. The method includes at least the following operations (and not necessarily in the following order): (i) applying a machine learning (ML) [artificial intelligence (AI)] model of a time ordered inputs representing weather conditions in a geographical region wherein the ML model forms a relative motion and change of values derived from the time order input; and (ii) analyzing the relative motion and change of values utilizing a locations database of the geographical region to form a natural language summarization description of the weather conditions in the geographical region prior to a generation of a visualization.

In some embodiments, the natural language description varies based on user adjustable thresholds. Additionally, the natural language description is outputted in a format that is suitable for receipt by an individual who is audibly impaired. Alternatively, the outputted format is an audible output. In some embodiments, the output is a rastered visualization, with the visualization's length being altered based on an audible output length relative to a user adjustable word rate.

Some embodiments of the present invention may include one, or more, of the following features, characteristics and/or advantages: (i) generating a rastered video to accompany a natural language narrative summary; (ii) generating a rastered video does not account for the need to measure length or adjustment of the generated weather visualization being summarized; (iii) automatically generating a natural language narration of an intended weather data display and then using that narration to automatically adjust the final rendering length of the visualization such that the final output is a merged visualization with spoken narration that is of the same length based on a user defined standard word rate is unique to the proposed invention; and (iv) the use of a user defined standard word rate, and the specific output of rastered video, makes embodiments of the present invention unique.

This is not simply image captioning or even complex image captioning. Embodiments of the present invention provide for a unique combination of data pre-analysis, narrative summarization (using natural language processing), speech generation and raster video generation. In some embodiments, the use of a user defined standard word rate to further calculate the render display length for, and the specific output of rastered video, makes embodiments of the present invention unique.

Some embodiments of the present invention analyze data to determine activity such as growth and decay, motion, location with reference to geography of one or more weather data layers, and returns a natural language spoken narration with a matching transcript. Based on a user defined spoken word rate, the length of a visualization of the analyzed weather layers over the user defined time and for the user defined area is automatically modified so that the final rendered output is generated in-sync with the automated spoken narration.

Embodiments of the present invention automates the creation of an audible (and written) natural language narrated rastered video output related to weather visualizations such that the length of the visualization matches the length of the spoken narration as generated using a user supplied standard word rate.

Embodiments of the present invention use data analysis in memory to generate a description of the motion, growth, decay, intensity, etc. of a given weather phenomenon for a virtually defined geographic region. Embodiments of the present invention then generates a natural language descriptive summary, the length of which is used against a standard word count value defined by the user to determine time length of a display for the virtualized visualization. This time length value is used to automatically adjust the final rendering of the virtual visualization to match the spoken narration that is embedded within the output.

In some embodiments, the visualization of weather phenomenon (including historical, current or future-based) that is generated is automatically verbally summarized using natural language processing, and the length of the visualization would match the length of the verbal spoken narration to allow for better apprehension and understanding by the consumer of the finished rendered video product including visual and audible information.

In some embodiments, any visualization of weather phenomenon can include historical weather data, current weather data, or future weather data. The way this visualization will ultimately be displayed in is independent of a two-dimensional (2D) or three-dimensional (3D) raster video rendering method. Additionally, the visualization of weather phenomenon (in rasterized form) can include the following types of visualizations: (i) forecast model data as sequences of value based on color ("contours" or "color coded contours") with a geographical reference (such as a map); (ii) satellite imagery with geographical reference; (iii) RADAR imagery with geographical reference; and (iv) animating observed or forecast data icons and values that are plotted onto a map (with the combination of the forecast data icons and values being an image).

Some embodiments of the present invention may include one, or more, of the following features, characteristics and/or advantages: (i) automatically verbally summarizes activity of the (to be) visualized data within the geographic regions specified by the user; (ii) the length of the visualization would match the length of the NLU spoken narration to allow for better apprehension and understanding by a consumer of the finished rendered video product (which is the combined visual and audible information); (iii) the descriptive real-world natural language output of the summarization would be focused on differences defined by the data visualization, including motion, growth and decay, etc. over the timeframe defined and for the region established by the user selection; and (iv) this summarization is used to define the length of the final rendered raster video visualization of the weather data itself.

Figure 4:
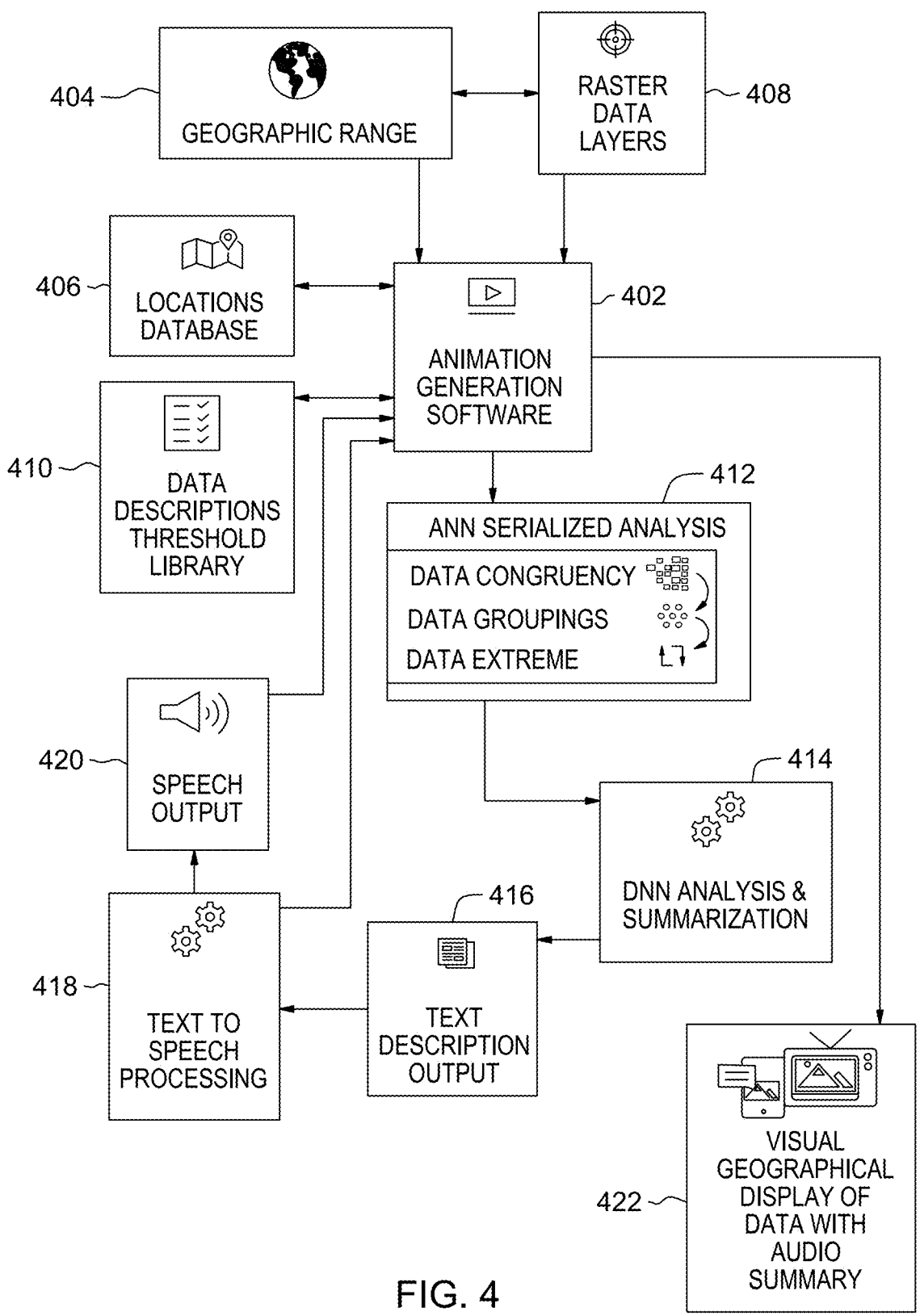
FIG. 4 is a flow diagram showing information that is helpful in understanding embodiments of the present invention.

Block diagram 400 of FIG. 4 will now be discussed. Block diagram 400 includes the following components: animation generation software 402, geographic range/region 404, locations database 406, raster data layers 408, data descriptions threshold library 410, artificial neural network (ANN) analysis module 412, deep neural network (DNN) analysis module 414, text description output module 416, text-to-speech processing module 418, speech output module 420, and visual geographic display module 422 (with module 422 including displaying the geographical data with an audio summary).

Diagram 400 shows that by using animation generation software 402 (geo-navigated raster animation generating software), a user can define a reference geo-navigated display region (such as region 404). Using the user defined temporal sequence settings for one or more rastered weather data layers (layers 408) as defined by the user through software 402 or defined as the minimum temporal inputs by the user that is adjustable by a Weather Data Threshold Library (such as library 410) (whichever is greater), each rastered weather data layer is referenced. From this process, data matching is extracted for analysis by a multimodal Artificial Neural Network (such as ANN analysis module 412) called by animation generation software 402.

ANN analysis module 412 includes a series of individual calculations that are completed in series using, in the following manner:

(i) With reference to an individual input data layer sequence, each rastered data extraction of the sequence is analyzed against one or more data thresholds set by the user through use of library 410. Additionally, congruent data points are identified with a geo-navigated position for each identified centroid of congruent data relative to weather phenomenon descriptions entered by the user;

(ii) If called for by library 410, the total extraction result is tabulated across the temporal sequence to determine growth or decay within the weather data variable against the defined threshold values; and (iii) Based on definitions for value extremes set by the user through the use of library 410, the geographical locations of the maximum/minimum value extremes or the centroids identified in point (i), above, across the temporal sequence are measured to determine general temporal motion of identified weather phenomenon.

In some embodiments, the cumulative collection of outputs from ANN analysis module 412 across all input raster weather data layer types, access to a numerical Weather Database (such as locations database 406) and the geo-navigation data from geographic range/region 404 are fed as inputs into a Deep Neural Network (such as DNN analysis module 414).

In some embodiments, data descriptions threshold library 410, with respect to user defined descriptions of assigned weather data measurements (inputs), cumulative events across independent weather data layers are identified and combined into a single describable instance using attributes from points (i), (ii), and (iii), referenced above. Through the user editable Geographical Locations Database (such as database 406), the user can enter and edit a location and enter or edit the reference priority of a location. Upon referencing the priority of the location, a natural language written summary (typically produced by module 416) of the cumulative temporal sequence is generated.

In some embodiments, this summary includes at least the following information: general description of weather phenomenon, information indicating an increase or decrease in the intensity and/or strength of an identified event, coverage pattern (such as: sporadic, widespread, isolated, tight gradient, tight line, etc.), relative motion, and key reference locations (typically received from geographic region/range 404) extracted from data descriptions threshold library 410 or user defined settings in animation generation software 402. Based on user settings defined in animation generation software 402, selected weather data layer values from raster data layers 408 or values for set locations for a particular weather data type pulled from locations database 406 based on settings defined in the display settings in software 402 can also be included in the summary that is returned to animation generation software 402.

In some embodiments, through the use of a user definable setting for word rate (such as through text-to-speech processing module 418), the generated summary spoken length is determined and the output length in animation generation software 402 for the display is automatically adjusted based on user settings in raster data layers 408 or overridden by user setting(s) in animation generation software 402 for specific data types.

Figure 5A:
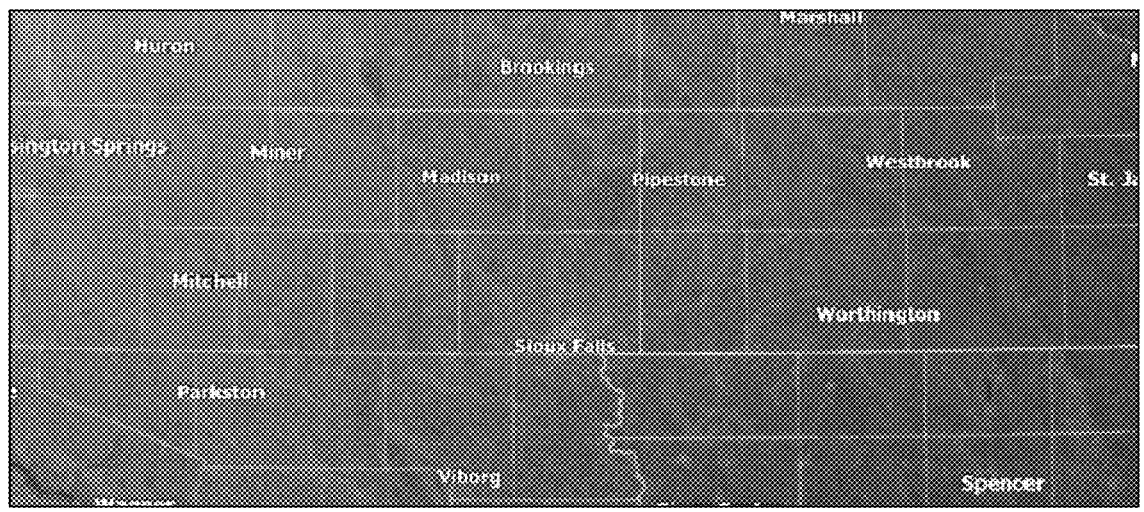
FIG. 5A is a screenshot view showing information that is generated by a first embodiment of the present invention.
Figure 5B:
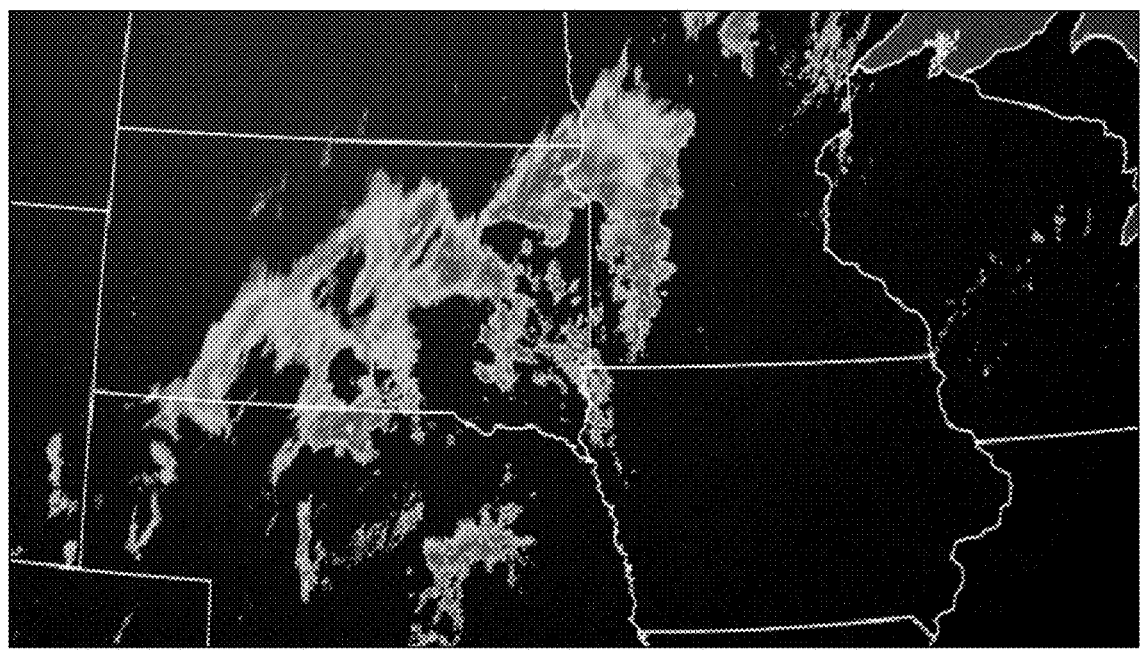
FIG. 5B is a screenshot view showing information that is generated by a first embodiment of the present invention.

In some embodiments, the adjustment could take the following forms: additional iterations of a temporal sequence display, additional display time of final temporal sequence frame, and/or any combination of the above. In some embodiments, the ultimate output is the final generation of the visually combined rastered sequence of the following: geographic region/range 404 and raster data layers 408. This can be shown in screenshot 500A of FIG. 5A and screenshot 500B of FIG. 5B.

This is done through animation generation software 402, with software 402 including an audio file or stream (such as speech output from module 420) of text from text description output module 416 that is used by during the playback of the final cumulative sequence (such as visual geographic display module 422).

Figure 6A:
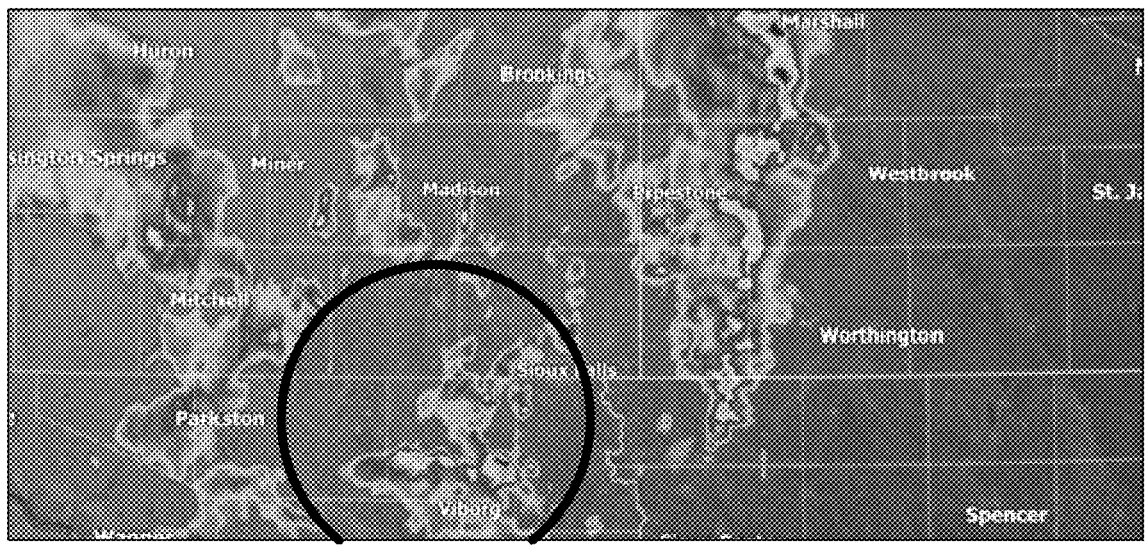
FIG. 6A is a screenshot view showing information that is generated by a second embodiment of the present invention.
Figure 6B:
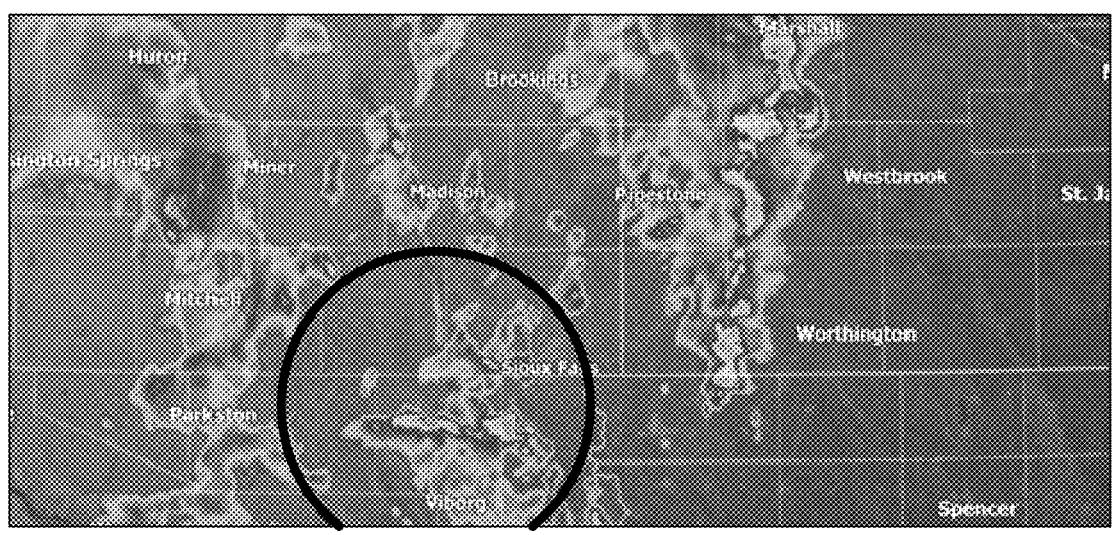
FIG. 6B is a screenshot view showing information that is generated by a second embodiment of the present invention.
Figure 6C:
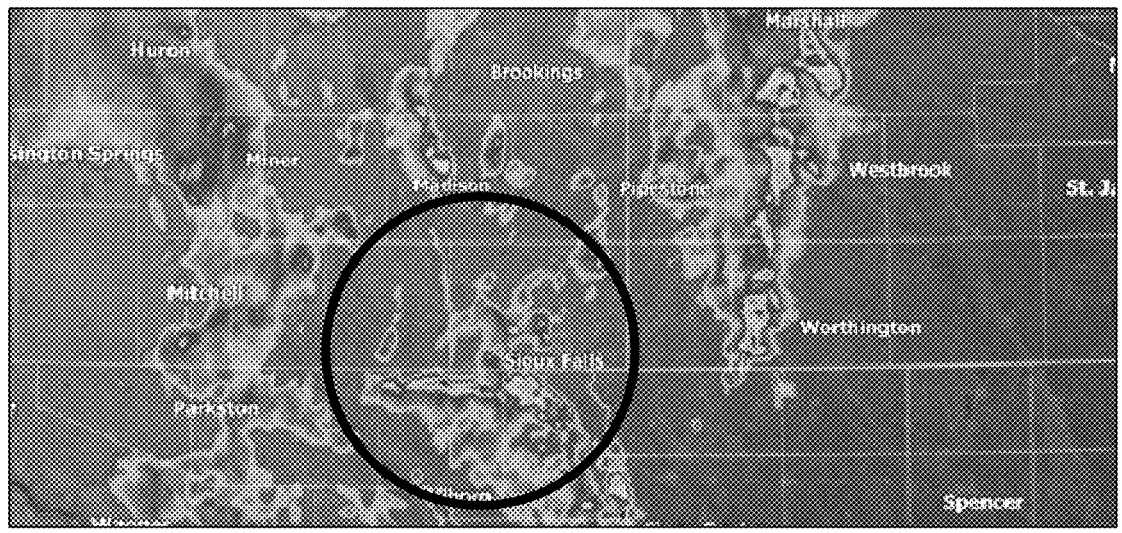
FIG. 6C is a screenshot view showing information that is generated by a second embodiment of the present invention.
Figure 6D:
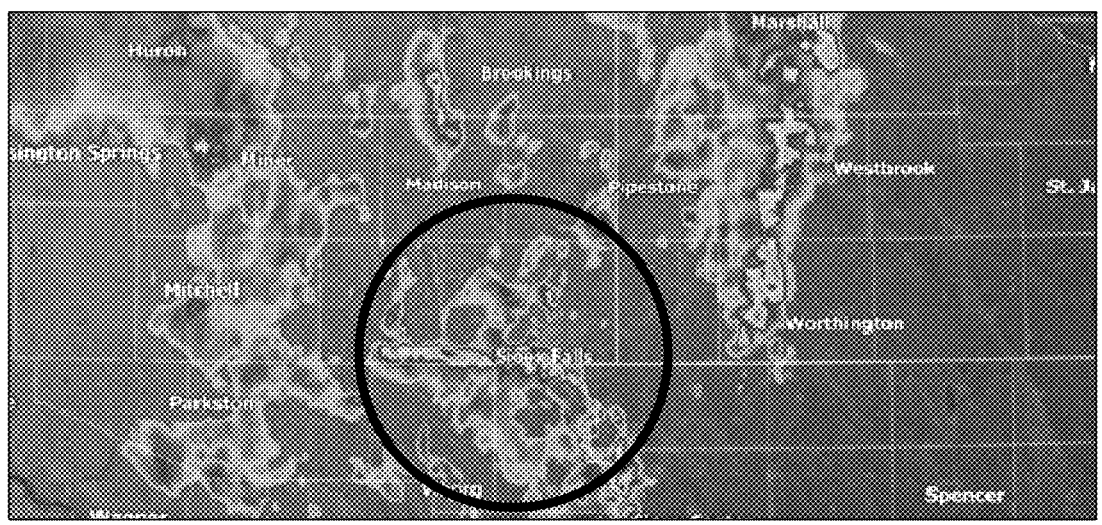
FIG. 6D is a screenshot view showing information that is generated by a second embodiment of the present invention.
Figure 6E:
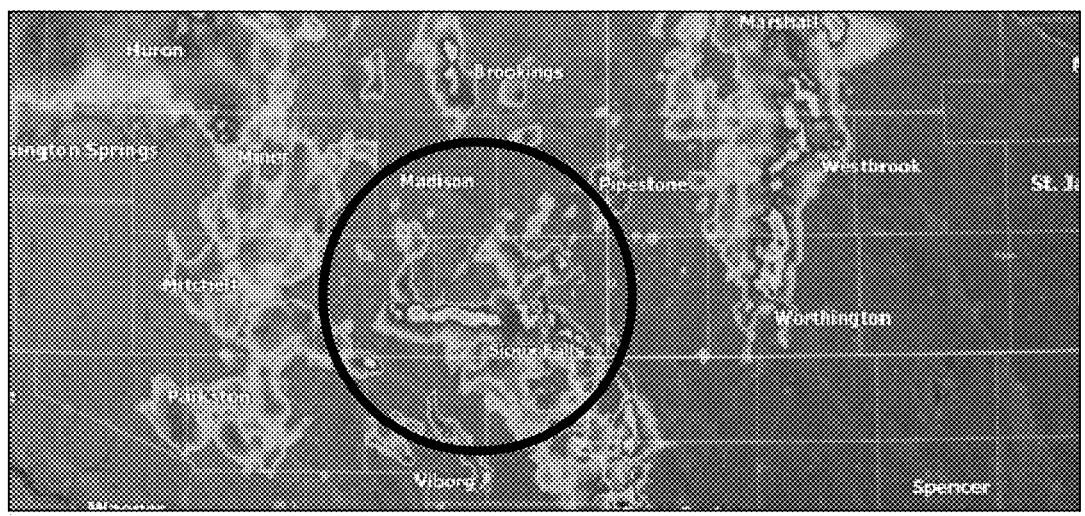
FIG. 6E is a screenshot view showing information that is generated by a second embodiment of the present invention.
Figure 6F:
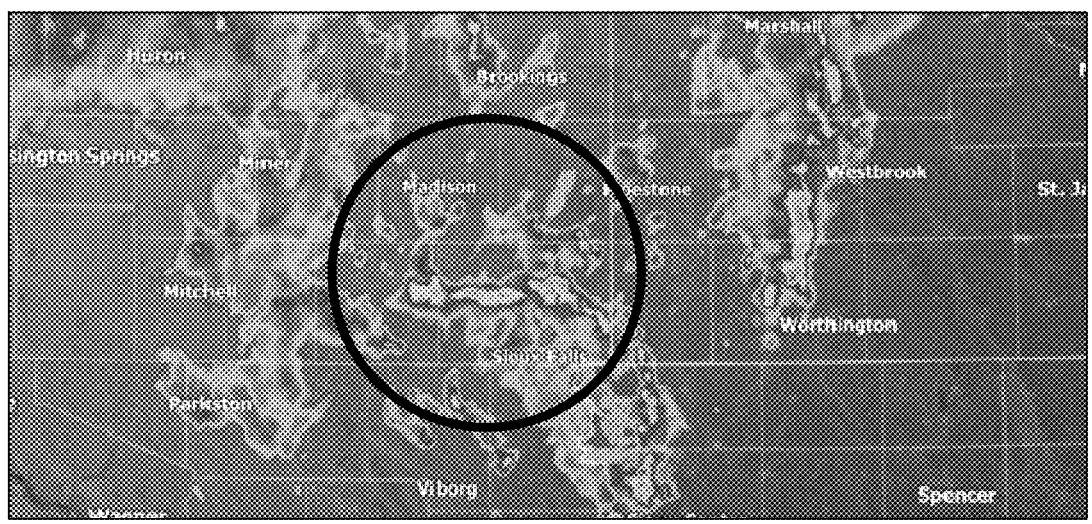
FIG. 6F is a screenshot view showing information that is generated by a second embodiment of the present invention.
Figure 6G:
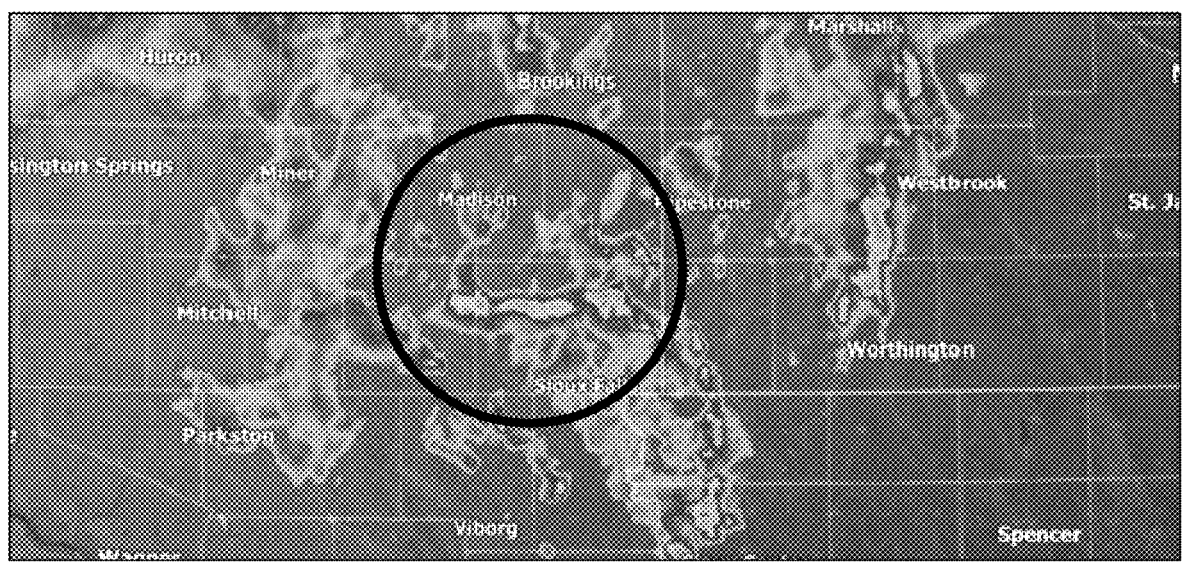
FIG. 6G is a screenshot view showing information that is generated by a second embodiment of the present invention.

The following discussion collectively references the following: screenshot 600A of FIG. 6A, screenshot 600B of FIG. 6B, screenshot 6C of FIG. 6C, screenshot 6D of FIG. 6D, screenshot 6E of FIG. 6E, screenshot 6F of FIG. 6F, and screenshot 6G of FIG. 6G.

These Figures collectively represent a frame-by-frame playback of a sequenced video according to certain embodiments of the present invention. Additionally, the playback of the sequenced video would adjust appropriately upon the completion of the summarization (discussed above in connection with the output of the final generation of the visually combined rastered sequence).

The collective frame-by-frame playback of the sequenced video provide the following insights: (i) there is a congruency against data thresholds that are done on image-by-image basis; (ii) there are groupings of data on an image-by-image basis; (ii) in screenshots 600A and 600B, the highlighted group is not contiguous, but in subsequent virtual frames, a line of similar contiguous values develops and moves on unison to form a single group; and (iii) there are extremes highlighted by the data on an image-by-image basis. Additionally, cumulative outputs from the first three insights are analyzed to produce a summarization. An example of this summarization can be: "Several lines of showers with isolated thunderstorms continue to move north-northeast into Minnesota from Eastern South Dakota. At twelve thirty, a line of strong storms just north of Sioux Falls continues to weaken as it moves northward at twenty miles per hour. Showers east of Mitchell continue to slowly migrate eastward."

In this summarization, a calculation based on a three (3) word per second user definable arbitrary word rate is made. With the total of 51 words above, it will take seventeen (17) seconds to be read audibly. Embodiments of the present invention then feeds that calculated value back to the display solution along with the text and narration. The playback sequence is then adjusted in length to account for the display length needed when the final combined raster display is generated for the viewer.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
 receiving a first weather data set including information indicative of: (i) a plurality of observed weather data points representing recent weather conditions, with the plurality of observed weather data points being a time ordered set of inputs, and (ii) a defined geographic region;
 grouping a first portion of data points of the plurality of observed weather data points based, at least in part, upon the first portion of data points exceeding a first threshold;
 creating a weather model with a deep neural network (DNN) by using the first portion of data points in the defined geographic region, with the weather model having information indicative of a relative motion of the recent weather conditions and a relative change of values of the first portion of data points over a period of time;
 analyzing, by the machine learning module, the relative motion of the recent weather conditions and the relative change of values utilizing a locations database of the defined geographical region;
 responsive to the analysis, creating, by a text description module, a natural language summarization of the recent weather conditions in the defined geographic region; and
 responsive to the creation of the natural language summarization, generating a raster-based weather visualization having a defined length, the defined length based on an audible output length corresponding to a user-defined word rate.

2. The method of claim 1 wherein the natural language summarization is configured to be modifiable by a user based upon user adjustable thresholds.

3. The method of claim 1 wherein the natural language summarization includes an audible output.

4. The method of claim 1 further including:
 adjusting, by a text-to-speech module, the audible output length of an audible output.

5. The method of claim 1 wherein a raster-based weather visualization includes information graphically displaying the relative change of values made to the received time ordered set of inputs.

6. A computer program product (CPP) comprising:
 a machine-readable storage device; and
 computer code stored on the machine-readable storage device, with the computer code including instructions and data for causing a processor(s) set to perform operations including the following:
  receiving a first weather data set including information indicative of: (i) a plurality of observed weather data points representing recent weather conditions, with the plurality of observed weather data points being a time ordered set of inputs, and (ii) a defined geographic region;
  grouping a first portion of data points of the plurality of observed weather data points based, at least in part, upon the first portion of data points exceeding a first threshold;
  creating a weather model with a deep neural network (DNN) by using the first portion of data points in the defined geographic region, with the weather model having information indicative of a relative motion of the recent weather conditions and a relative change of values of the first portion of data points over a period of time;
  analyzing, by the machine learning module, the relative motion of the recent weather conditions and the relative change of values utilizing a locations database of the defined geographical region;
  responsive to the analysis, creating, by a text description module, a natural language summarization of the recent weather conditions in the defined geographic region; and responsive to the creation of the natural language summarization, generating a raster-based weather visualization having a defined length, the defined length based on an audible output length corresponding to a user-defined word rate.

7. The CPP of claim 6 wherein the natural language summarization is configured to be modifiable by a user based upon user adjustable thresholds.

8. The CPP of claim 6 wherein the natural language summarization includes an audible output.

9. The CPP of claim 6 further including:
adjusting, by a text-to-speech module, the audible output length of an audible output.

10. The CPP of claim 6 wherein a raster-based weather visualization includes information graphically displaying the relative change of values made to the received time ordered set of inputs.

11. A computer system (CS) comprising:
a processor(s) set;
a machine-readable storage device; and
computer code stored on the machine-readable storage device, with the computer code including instructions and data for causing the processor(s) set to perform operations including the following:
receiving a first weather data set including information indicative of: (i) a plurality of observed weather data points representing recent weather conditions, with the plurality of observed weather data points being a time ordered set of inputs, and (ii) a defined geographic region;
grouping a first portion of data points of the plurality of observed weather data points based, at least in part, upon the first portion of data points exceeding a first threshold;
creating a weather model with a deep neural network (DNN) by using the first portion of data points in the defined geographic region, with the weather model having information indicative of a relative motion of the recent weather conditions and a relative change of values of the first portion of data points over a period of time;
analyzing, by the machine learning module, the relative motion of the recent weather conditions and the relative change of values utilizing a locations database of the defined geographical region;
responsive to the analysis, creating, by a text description module, a natural language summarization of the recent weather conditions in the defined geographic region; and
responsive to the creation of the natural language summarization, generating a raster-based weather visualization having a defined length, the defined length based on an audible output length corresponding to a user-defined word rate.

12. The CS of claim 11 wherein the natural language summarization is configured to be modifiable by a user based upon user adjustable thresholds.

13. The CS of claim 11 wherein the natural language summarization includes an audible output.

14. The CS of claim 11 further including:
adjusting, by a text-to-speech module, the audible output length of an audible output.

15. The CS of claim 11 wherein a raster-based weather visualization includes information graphically displaying the relative change of values made to the received time ordered set of inputs.

* * * * *